UNITED STATES PATENT OFFICE.

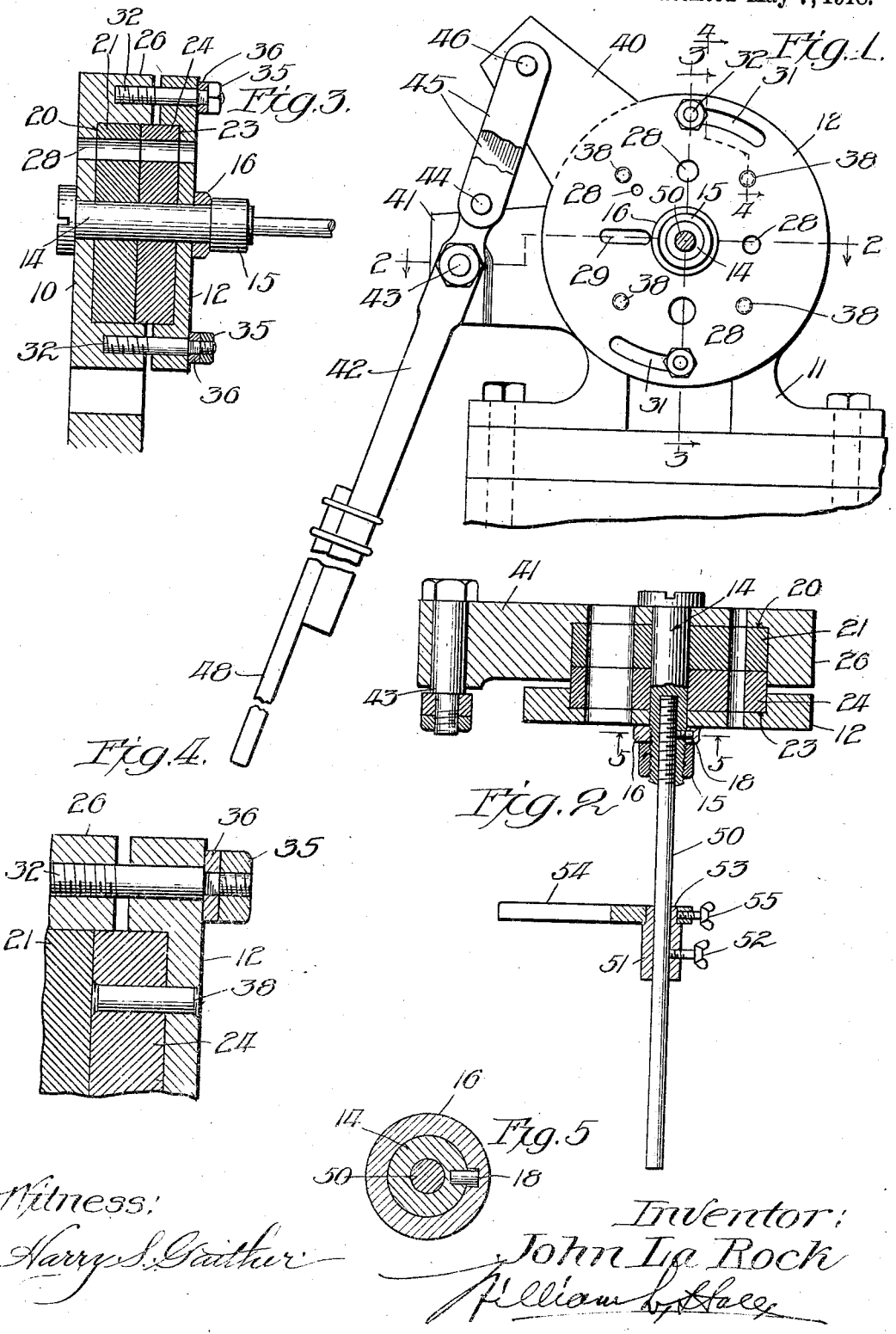

JOHN LA ROCK, OF CHICAGO, ILLINOIS.

METAL-CUTTING MACHINE.

1,265,345.  Specification of Letters Patent.  Patented May 7, 1918.

Application filed January 8, 1917.  Serial No. 141,255.

*To all whom it may concern:*

Be it known that I, JOHN LA ROCK, a citizen of the United States, residing at Chicago, in the county of Cook and State of Illinois, have invented certain Improvements in Metal-Cutting Machines; and I do hereby declare that the following is a full, clear, and exact description thereof, reference being had to the accompanying drawings, and to the characters of reference marked thereon, which form a part of this specification.

This invention relates to a novel metal shearing machine for shearing round, square and flat metal stock, and the invention consists in the combination and arrangement of the parts shown in the drawings and described in the specification, and is more particularly pointed out in the appended claims.

Among the objects of the invention is to provide a shearing machine in which the stock is cut or sheared between the flat parallel faces of shearing elements, with means whereby said elements are held and maintained in absolute parallelism, and are prevented from separating under the shearing stress of the cutting operation, so as to produce straight clean cuts of the stock.

Another object of the invention is to provide a machine of this character in which the parts are so constructed and combined as to produce an exceedingly strong and durable machine, and one in which the wear of the parts, due to the movement of one part on the other, may be readily taken up and the shearing or cutting elements maintained in accurate cutting or shearing relation.

A further object of the invention is to provide novel means of actuating the movable element of the shearing or cutting machine, whereby the power applied is compounded to produce a very efficient cutting effect.

A further object of the invention is to provide a novel gage device for measuring the lengths cut from the stock operated on.

Other objects of the invention are to generally improve and simplify shearing or cutting machines for the purpose stated.

In the drawings showing one illustrative embodiment of my invention,—

Figure 1 is a side elevation of my improved shearing machine.

Fig. 2 is a section on the line 2—2 of Fig. 1.

Fig. 3 is a section on line 3—3 of Fig. 1.

Fig. 4 is an enlarged detail section of the irregular line 4—4 of Fig. 1.

Fig. 5 is a section on the line 5—5 of Fig. 2.

The frame of the machine comprises a fixed casing or housing 10, which is provided with a base 11, by which it may be bolted or otherwise rigidly secured to a support, and a movable casing or housing 12. The fixed housing 10 is axially pierced to receive a headed pivot stud 14, which latter extends through an axial opening in the movable member 12 to constitute a pivot upon which the latter is rotated. A nut 15, threaded to said stud 14, serves to clamp the housing or frame members 10 and 12 together. In order to prevent the movement of the movable frame member or housing 12 loosening said nut, a washer 16 is interposed between the nut and the movable housing 12 and said washer is nonrotatively fixed to the stud by means of a key 18, which enters a slot in the washer 16.

The said fixed housing 10 is formed with an annular recess 20, disposed concentrically to the axis of the stud 14 to receive a cylindric blade 21 constituting one of the cutting elements of the machine. Said blade is axially apertured for the passage of the pivot stud 14. The movable housing member 12 is likewise provided with a recess 23, concentrically disposed with respect to the pivot stud 14, to receive a second cylindric cutting blade or element 24 of the shearing or cutting machine, which latter cutting blade is axially pierced for the passage of the pivot stud 14.

The contiguous faces of said cutting elements 21, 24 are flat and parallel with each other, and the cutting element 24 is of a width to extend inwardly beyond the inner face of its carrying member 12 and into the recess 20 of the housing member 10, the outer wall of said recess constituting a rim 26 within the internal cylindric face of which the said cutting element 24 extends and has bearing.

The said housing and cutting elements are provided with an annular series of other openings designated generally as 28, 29, of different diameters and cross sectional contours, and the stock to be cut is inserted through these registering openings and is severed by rotating the movable member 12 of the machine on its pivot stud 14 relatively to the fixed member 10 thereof.

As a further means of firmly holding the mating faces of the shearing or cutting elements together (in addition to the clamping nut 15), the movable housing member 12 of the machine may be provided with arcuate slots 31, 31 through which extend studs 32, 32, anchored in the fixed housing member; and said studs are threaded at their outer ends to receive clamping nuts 35. The length of said slots 31 is such as to permit the required range of angular movement of the movable housing member 12 and the ends of said slots coöperate with the studs 32 to afford stops to limit the movement of the angularly displaceable housing member 12 to bring the openings 28, 29 in register with each other when the parts assume the positions shown in Fig. 1. In order to prevent the movement of the angularly displaceable housing member 12 from loosening the nuts 35, I may interpose washers 36 between said nuts and said housing members which are nonrotatively fixed on the studs, as by making the studs and the bores of the washers of corresponding polygonal cross section. In order that the shearing elements 21 and 24 may be held fixedly in their housing members pins or rivets 38 are extended through each shearing element and its supporting housing member.

The rotative housing member and its shearing element may be operated through a compound lever operating mechanism made as follows:

The said rotative housing member is provided with a stout rigid arm 40, which moves therewith and the fixed housing member is provided with a stationary, horizontally directed arm 41. 42 designates a lever which is pivoted at 43 to the stationary arm 41. The free end of the lever is pivotally connected by a stud or rivet 44 to a pair of links 45 and said links are pivoted at their upper ends through the medium of a pivot stud or rivet 46 to the arm 40 of the rotative member.

When the rotative housing member is in position to bring the stock openings 28, 29 of all the elements into register, as shown in Fig. 1 (and which registration is determined by the contact of the studs 32 with the ends of their respective arcuate slots 31) the hand lever 42 is substantially parallel with the links 45. To operate the rotative member of the cutting machine, the end of the lever is swung outwardly away from the base of the machine and the links 45 serve to draw the arm 40 downwardly with a compound lever effect to rotate the movable member of the machine. Said hand lever 42 may be provided with an extension 48 which may be connected to the lever 42 in any suitable manner and the office of which is to increase the effect of the power applied to operate the machine.

A gage device is provided for determining the lengths cut from the stock. The gage device herein shown consists of a rod 50 which is screw threaded at one end to engage an internally threaded axial opening of the pivot stud 14, as best shown in Fig. 2. 51 designates a sleeve which is mounted on the rod 50 and which is adapted to slide lengthwise thereof. Said sleeve may be locked to the rod by means of a set screw 52. The sleeve is reduced at one end to form a bearing 53 for a gage bar 54 that is apertured to fit over said bearing 53. The shape of the opening in said gage bar and that of the bearing are such as to permit the gage bar to swing or rotate about the axis of the sleeve 51; and the gage bar may be locked to the sleeve by means of a stud screw 55.

With the construction shown and described it will be observed that the gage bar may serve all of the through openings 28 of the cutting machine when cutting stocks of different diameters and cross sections, but of the same length; and the provision of the two sets of locking screws 52 and 55 makes it possible to so rotatively adjust the gage bar 54 without interfering with the length adjustment of the gage as a whole.

In the operation of the device it will be understood that the stock to be cut is inserted through the openings 28 29, from the side of the machine remote from the gage, the gage bar being adjusted by reason of its rotative bearing on the sleeve 51 opposite to the particular opening used. The length of the piece to be cut from the stock is equal to the distance between the gage face of the gage bar 54 and the mating faces of the cutting elements 21 and 24. After the stock has been inserted through the proper opening 28 or 29 and arrested by the gage bar, the hand lever is swung upwardly so as to rotate the movable housing member of the machine downwardly and so sever the stock.

It will be understood that the cutting machine may be somewhat varied from the structural details herein shown without departing from the spirit of the invention and that the invention is not therefore limited to such details, except as said details are hereafter specifically enumerated in the claims and as imposed by the prior art.

I claim as my invention:

1. A cutting machine comprising a fixed recessed frame, a rocking recessed frame spaced therefrom, a pivot stud seated in the fixed frame on which the rocking frame is mounted, shearing blades provided with flat contacting cutting faces and with registering stock openings, one of said blades being mounted in the recess of the fixed frame and the other blade being mounted in the recess of the rocking frame and extending partially into the recess of the fixed frame and peripherally supported by the wall of the latter recess and means for operating the rocking frame.

2. A cutting machine comprising a fixed recessed frame, a rocking recessed frame spaced therefrom, a pivot stud seated axially in the fixed frame on which the rocking frame is mounted, axially apertured shearing blades mounted on said stud provided with flat contacting faces and with registering stock openings, one of said blades being mounted in the recess of the fixed frame and the other blade being mounted in the recess of the rocking frame, means for operating the rocking frame, and means on said stud for pressing said blades together.

3. A cutting machine comprising a fixed recessed frame, a rocking recessed frame spaced from the fixed frame, a pivot stud seated in the fixed frame on which the rocking frame is axially mounted, shearing blades having flat contacting cutting faces, and provided with registering stock openings, one of said shearing blades being mounted in the recess of the fixed frame and the other blade being mounted in the recess of the rocking frame and extending partially into the recess of the fixed frame, and a nut threaded to one end of the said stud and acting against the frame to press the cutting faces of said blades upon each other.

4. A cutting machine comprising a fixed recessed frame, a rocking recessed frame spaced therefrom, a pivot stud seated in the fixed frame on which the rocking frame is axially mounted, shearing blades having flat contacting cutting faces and provided with registering stock openings, one of said shearing blades being mounted in the recess of the fixed frame and the other blade being mounted in the recess of the rocking frame and extending partially into the recess of the fixed frame, means whereby the rocking frame may be operated, means acting on the said stud to press the cutting faces of said blades together, said rotative frame being provided with arcuate slots, combined stop and clamping studs anchored in the fixed frame and extending through said slots and nuts screw threaded to the ends of said studs.

5. A cutting machine comprising a frame provided with a circular recess surrounded by a rim, a fixed shearing element in said recess and terminating short of the outer edge of the rim, a circular rotative shear element extended into said rim and peripherally supported by the wall of said recess and having face to face contact with the fixed shearing element, a pivot stud extending through said frame and extending axially through said shearing elements, with adjustable means on said stud whereby the shearing elements are forced into shearing engagement, means to operate the rotative shearing element and stock openings extending through said frame and said shearing elements.

6. A cutting machine comprising a frame provided with a circular recess surrounded by a rim, a fixed shearing element in said recess and terminating short of the outer edge of the rim, a recessed rocking member, a shearing element in the recess of the rocking member spaced from said frame and extending laterally therefrom and partially into the recess of said frame and peripherally engaging the wall of said frame recess and having face to face contact with the fixed shearing element, a stud extending through the fixed frame and its shearing element on which the rocking member and its shearing element are mounted, with means on the stud and acting against the frame for holding the shearing elements in shearing engagement, there being one or more stock openings in the shearing elements and their respective frames or members and means for operating the rocking shearing member.

7. The combination with a shearing machine provided with a fixed and a rocking shearing element having registering stock openings, of a stock gage comprising a rod fixed axially to the machine, a sleeve slidable on said rods with means to lock it thereon and a gage bar rotative on said sleeve with means to lock it to the sleeve.

In witness whereof I claim the foregoing as my invention, I hereunto append my signature in the presence of two witnesses at Chicago, Illinois, this 27th day of December, 1916.

JOHN LA ROCK.

Witnesses:
W. L. HALL,
A. E. WALBRIDGE.

Copies of this patent may be obtained for five cents each, by addressing the "Commissioner of Patents, Washington, D. C."